US012784580B2

(12) United States Patent
Mimura

(10) Patent No.: US 12,784,580 B2
(45) Date of Patent: Nov. 3, 2026

(54) ACTION PROBABILITY ESTIMATION DEVICE AND TRAFFIC SAFETY SUPPORT SYSTEM

(71) Applicant: HONDA MOTOR CO., LTD., Tokyo (JP)

(72) Inventor: Yoshitaka Mimura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 81 days.

(21) Appl. No.: 18/901,441

(22) Filed: Sep. 30, 2024

(65) Prior Publication Data

US 2025/0111773 A1 Apr. 3, 2025

(30) Foreign Application Priority Data

Oct. 3, 2023 (JP) ................................ 2023-172187

(51) Int. Cl.
*G08G 1/01* (2006.01)
*G08G 1/16* (2006.01)

(52) U.S. Cl.
CPC ........... *G08G 1/0125* (2013.01); *G08G 1/166* (2013.01)

(58) Field of Classification Search
CPC ............................ G08G 1/0125; G08G 1/166
USPC .......................................................... 701/117
See application file for complete search history.

(56) References Cited

U.S. PATENT DOCUMENTS

2019/0102689 A1* 4/2019 Lassoued ............... G07C 5/085
2022/0306147 A1* 9/2022 Peng .................. B60W 60/001

FOREIGN PATENT DOCUMENTS

JP 2009134496 A * 6/2009
JP 2022121930 A * 8/2022
WO 2023/089823 A1 5/2023

OTHER PUBLICATIONS

Machine Translation JP2009134496 (Year: 2009).*
Machine Translation JP2022121930 (Year: 2022).*

* cited by examiner

*Primary Examiner* — Tara Schimpf
(74) *Attorney, Agent, or Firm* — Rankin, Hill & Clark LLP

(57) ABSTRACT

An action probability estimation device includes a risk calculation unit that calculates a risk index value as a numerical value representing a degree of magnitude of a collision risk between a traffic participant around a target vehicle and the target vehicle; and a probability estimation unit that estimates, on the basis of the risk index value and a driver characteristic as a characteristic of a driver of the target vehicle, an action probability that the driver executes a predetermined steering action, which is determined in advance, in the target vehicle, in which the driver characteristic includes a confidence level as a numerical value representing a degree of a level of confidence of the driver regarding his/her driving skill, and a situational daring level as a numerical value indicating a degree of magnitude of a tendency of the driver to carry out an action while knowing that it is dangerous.

10 Claims, 5 Drawing Sheets

ACTION PROBABILITY ESTIMATION DEVICE AND TRAFFIC SAFETY SUPPORT SYSTEM

INCORPORATION BY REFERENCE

The present application claims priority under 35 U.S.C.§ 119 to Japanese Patent Application No. 2023-172187 filed on Oct. 3, 2023. The content of the application is incorporated herein by reference in its entirety.

TECHNICAL FIELD

The present invention relates to an action probability estimation device and a traffic safety support system.

RELATED ART

In recent years, efforts to provide access to sustainable transportation systems in consideration of vulnerable people among traffic participants have been gaining momentum. In order to realize this, research and development for further improving traffic safety and convenience is focused on research and development regarding driving support technology.

WO 2023/089823A1 discloses a traffic safety support system that supports avoidance of a risk that three or more traffic participants are involved. This traffic safety support system recognizes each of a motorcycle, a four-wheeled vehicle, and a pedestrian group in a traffic area as a traffic participant, and predicts a future behavior of the motorcycle, a future behavior of the four-wheeled vehicle according to the future behavior of the motorcycle, and a chain risk in the future of the pedestrian group according to the future behavior of at least one of the motorcycle and the four-wheeled vehicle on the basis of information regarding driving abilities of drivers of the motorcycle and the four-wheeled vehicle.

SUMMARY

By the way, in the driving support technology, it is a problem to perform driving support before an accident risk becomes apparent.

In order to solve the above problem, an object of the present application is to appropriately estimate an action probability of a steering action that a driver of a target vehicle can execute according to a traffic situation. Then, an appropriate warning is given to the target vehicle and the surrounding traffic participants on the basis of the estimated action probability, which contributes to development of a sustainable transportation system.

An aspect of the present invention is an action probability estimation device including a risk calculation unit that calculates a risk index value as a numerical value representing a degree of magnitude of a collision risk between a traffic participant around a target vehicle and the target vehicle; and a probability estimation unit that estimates, on the basis of the risk index value and a driver characteristic as a characteristic of a driver of the target vehicle, an action probability as a probability that the driver executes a predetermined steering action, which is determined in advance, in the target vehicle, in which the driver characteristic includes a confidence level as a numerical value representing a degree of a level of confidence of the driver regarding his/her driving skill, and a situational daring level as a numerical value indicating a degree of magnitude of a tendency of the driver to carry out an action while knowing that it is dangerous.

According to another aspect of the present invention, the confidence level and the situational daring level are calculated in advance for each individual to be the driver, and are stored as a part of the driver characteristic in a storage device.

According to another aspect of the present invention, the action probability estimation device further includes an emotion estimation unit that calculates an emotion level as a numerical value representing a degree of magnitude of an unpleasant emotion felt by the driver, and the probability estimation unit estimates the action probability on the basis of the driver characteristic, the risk index value, and the emotion level.

According to another aspect of the present invention, the emotion estimation unit calculates an emotion level on the basis of physiological data of the driver and/or an action schedule of the driver.

According to another aspect of the present invention, the action probability is estimated using a logistic regression model.

According to another aspect of the present invention, the predetermined steering action is a lane change action of changing a traveling lane of the target vehicle.

According to another aspect of the present invention, the risk index value is represented by a forward collision margin time that is a time to collision between a preceding vehicle, which is the traffic participant and travels in front of the target vehicle, and the target vehicle, and a backward collision margin time that is a time to collision between a following vehicle, which is the traffic participant and travels behind the target vehicle, and the target vehicle.

According to another aspect of the present invention, the target vehicle is a motorcycle, and the following vehicle is a four-wheeled vehicle.

Another aspect of the present invention is an action probability estimation method which is executed by a computer and estimates a probability that a driver of a target vehicle executes a predetermined steering action, and the action probability estimation method includes a risk calculation step of calculating a risk index value as a numerical value representing a degree of magnitude of a collision risk between a traffic participant around the target vehicle and the target vehicle; and an estimation step of estimating, on the basis of the risk index value and a driver characteristic as a characteristic of the driver of the target vehicle, an action probability as a probability that the driver executes a predetermined steering action, which is determined in advance, in the target vehicle, in which the driver characteristic includes a confidence level as a numerical value representing a degree of a level of confidence of the driver regarding his/her driving skill, and a situational daring level as a numerical value indicating a degree of magnitude of a tendency of the driver to carry out an action while knowing that it is dangerous.

Another aspect of the present invention is a traffic safety support system including the action probability estimation device described above; and a notification device that performs an attention calling notification to the driver of the target vehicle and/or the traffic participant on the basis of the action probability estimated by the action probability estimation device, in which in a case where the backward collision margin time is less than a predetermined first time threshold value, the notification device performs an attention calling notification with a first level in the target vehicle and the following vehicle when the action probability of the target vehicle is less than a predetermined probability threshold value, and performs an attention calling notification with a second level having a higher salience level than the attention calling notification with the first level when the action probability of the target vehicle is equal or greater than the probability threshold value.

According to another aspect of the present invention, in a case where the backward collision margin time is equal to or greater than the first time threshold value and is equal to or less than a predetermined second time threshold value that is greater than the first time threshold value, the notification device performs a notification of information presentation indicating presence of the target vehicle, in the following vehicle when the action probability of the target vehicle is less than the probability threshold value, and performs the attention calling notification with the first level in the following vehicle when the action probability of the target vehicle is equal to or greater than the probability threshold value.

According to the present invention, the action probability that the driver of the target vehicle executes a predetermined steering action depending on the degree of the collision risk with the traffic participant can be appropriately estimated in consideration of characteristics such as the personality of the driver of the target vehicle.

DETAILED DESCRIPTION

Hereinafter, embodiments of the present invention will be described with reference to the drawings.

1. Overview

Figure 1:
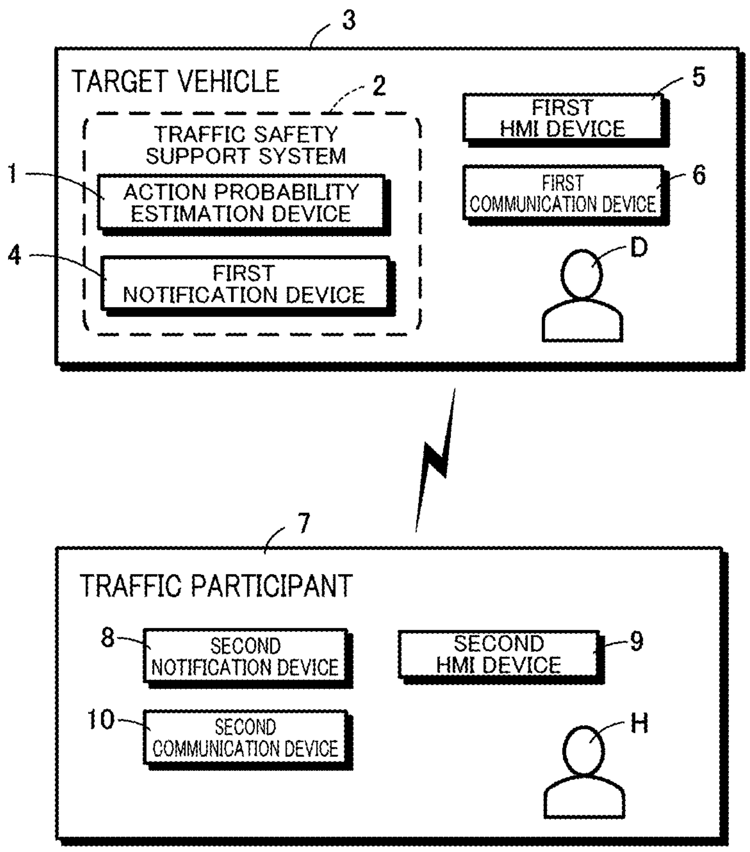
FIG. 1 is an explanatory diagram for describing an overview of an action probability estimation device and a traffic safety support system including the action probability estimation device according to an embodiment of the present invention.

FIG. 1 is an explanatory diagram for describing an overview of an action probability estimation device 1 and a traffic safety support system 2 including the action probability estimation device 1 according to an embodiment of the present invention.

The action probability estimation device 1 and the traffic safety support system 2 are provided in a target vehicle 3.

The action probability estimation device 1 estimates an action probability that a driver D of the target vehicle 3 executes a predetermined steering action depending on a degree of a collision risk with a traffic participant 7 around the target vehicle 3. In the present embodiment, in particular, the action probability estimation device 1 estimates the action probability of the driver in consideration of characteristics such as the personality of the driver.

The traffic safety support system 2 performs safety support by notifying the target vehicle 3 and/or the traffic participant 7 on the basis of the action probability estimated by the action probability estimation device 1.

The traffic safety support system 2 includes the action probability estimation device 1 and a first notification device 4 that are provided in the target vehicle 3. The first notification device 4 notifies the driver D of the target vehicle and/or the traffic participant 7. The traffic safety support system 2 causes the first notification device 4 to perform various notifications for traffic safety support, to the target vehicle 3 and/or the traffic participant 7 on the basis of the action probability estimated by the action probability estimation device 1.

The notification in the target vehicle 3 is performed, for example, by the first notification device 4 outputting various notifications to the driver D by a first human machine interface (HMI) device 5 provided in the target vehicle 3. The notification to the traffic participant 7 is performed by the first notification device 4 included in the target vehicle 3 transmitting a notification instruction for instructing various notifications to the traffic participant 7, via a first communication device 6 (transmitter/receiver, circuit). A second notification device 8 of the traffic participant 7 receives the notification instruction through a second communication device 10 (transmitter/receiver, circuit), and outputs various notifications through a second HMI device 9 according to the received notification instruction.

The traffic participant 7 may be another vehicle (another vehicle) or a human such as a pedestrian present around the target vehicle 3. In a case where the traffic participant is another vehicle, the second notification device 8, the second HMI device 9, and the second communication device 10 may be in-vehicle devices. The second HMI device 9 outputs a notification to human H who is a driver of the other vehicle. In addition, when the traffic participant 7 is the human H such as a pedestrian, the second notification device 8, the second HMI device 9, and the second communication device 10 may be, for example, a mobile terminal such as a smartphone owned by the human H. The second HMI device 9 outputs a notification to the human H such as a pedestrian.

In the present embodiment, for example, the target vehicle 3 is a motorcycle, and the traffic participant is a four-wheeled automobile. In the case of this combination, in particular, by using the action probability estimation device 1, it is possible to appropriately estimate the action probability for the driver D and to more appropriately support the driver D for safe driving by setting, as the target vehicle 3, the motorcycle in which control intervention in a vehicle body motion is more difficult than the four-wheeled vehicle and thus calling attention to the driver may be more important. In addition, in a traffic scene including a motorcycle and a four-wheeled vehicle where cooperative safety support is difficult to perform due to a difference in mobility of the vehicle body, it is possible to realize the cooperative traffic support on the basis of an action probability appropriately estimated for the motorcycle.

Figure 2:
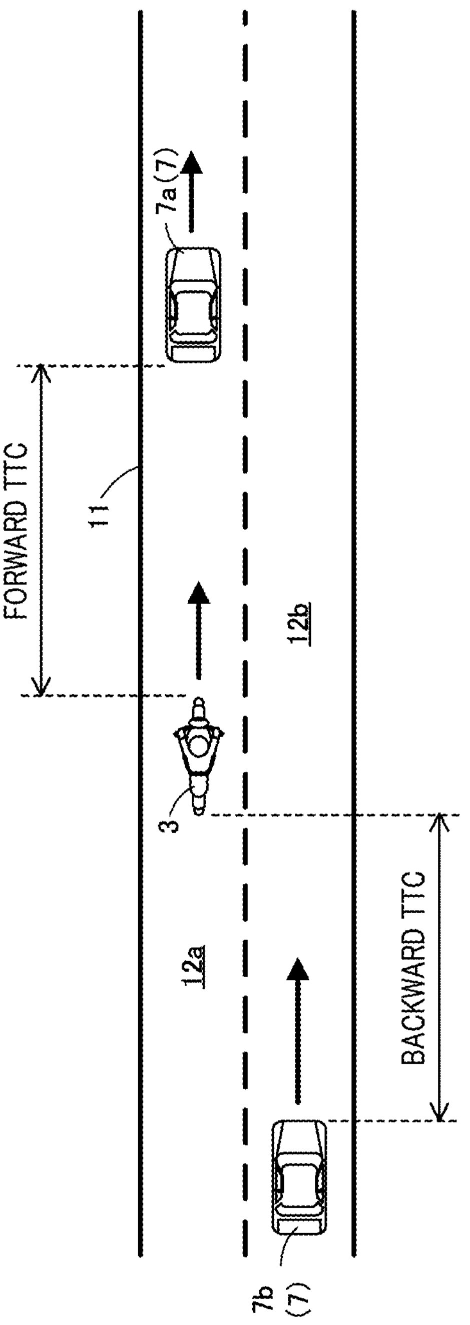
FIG. 2 is a diagram illustrating an example of a specific traffic scene in which the action probability estimation device and the traffic safety support system of the present embodiment are operated.

FIG. 2 is a diagram illustrating an example of a specific traffic scene in which the action probability estimation device 1 and the traffic safety support system 2 of the present embodiment are operated. In the traffic scene of FIG. 2, the target vehicle 3, which is a motorcycle, is traveling on a lane 12*a* of a road 11 having two lanes (lanes) of lanes 12*a* and 12*b*. In the road 11, as the traffic participants 7 around the target vehicle 3, there are a preceding vehicle 7*a* traveling in front of the target vehicle 3 and a following vehicle 7*b* traveling behind the target vehicle 3. The preceding vehicle 7*a* is traveling on the same lane 12*a* as the target vehicle 3, and the following vehicle 7*b* is traveling on the lane 12*b*.

The action probability estimation device 1 calculates an action probability that is a probability that the driver D of the target vehicle 3 performs a predetermined steering action on the target vehicle 3 according to the traffic situation including the preceding vehicle 7*a* and the following vehicle 7*b* that are surrounding traffic participants, and the target vehicle 3. In the present embodiment, the predetermined steering action is, for example, a lane change action of changing a traveling lane of the target vehicle 3 from the lane 12*a* to the lane 12*b*.

In addition, the traffic safety support system 2 notifies the target vehicle 3, the preceding vehicle 7*a*, and/or the following vehicle 7*b* for the traffic safety support, on the basis of the action probability estimated by the action probability estimation device 1. In the present embodiment, the traffic safety support system 2 notifies the target vehicle 3 and/or the following vehicle 7*b* for the traffic safety support, on the basis of the action probability of the lane change action of the target vehicle 3 estimated by the action probability estimation device 1.

Note that the traffic scene illustrated in FIG. 2 is an example, and the action probability estimation device 1 and the traffic safety support system 2 can be operated in any traffic scene encountered by the target vehicle 3. For example, the road on which the target vehicle 3 travels may be an urban road with a crosswalk, an intersection, a junction or a branch point of an expressway, or an inside of a parking lot. In addition, the predetermined steering action executed by the driver D of the target vehicle 3 is not limited to the lane change action, and may be any unsafe risk action that can induce contact with the traffic participant. Such a risk action may be, for example, sudden acceleration, sudden deceleration, sudden lane change, interruption, an action of reducing the inter-vehicle distance with respect to a preceding vehicle or a following vehicle, an action of continuing to travel across lanes, zigzag traveling, wrong-way driving, ignoring traffic signals, an action of traveling at a higher speed than a surrounding moving object by a predetermined speed or more, an action of traveling at a lower speed than a surrounding moving object by a predetermined speed or more, an action of hindering movement of a surrounding traffic participant, or the like.

2. Configuration of Action Probability Estimation Device

Figure 3:
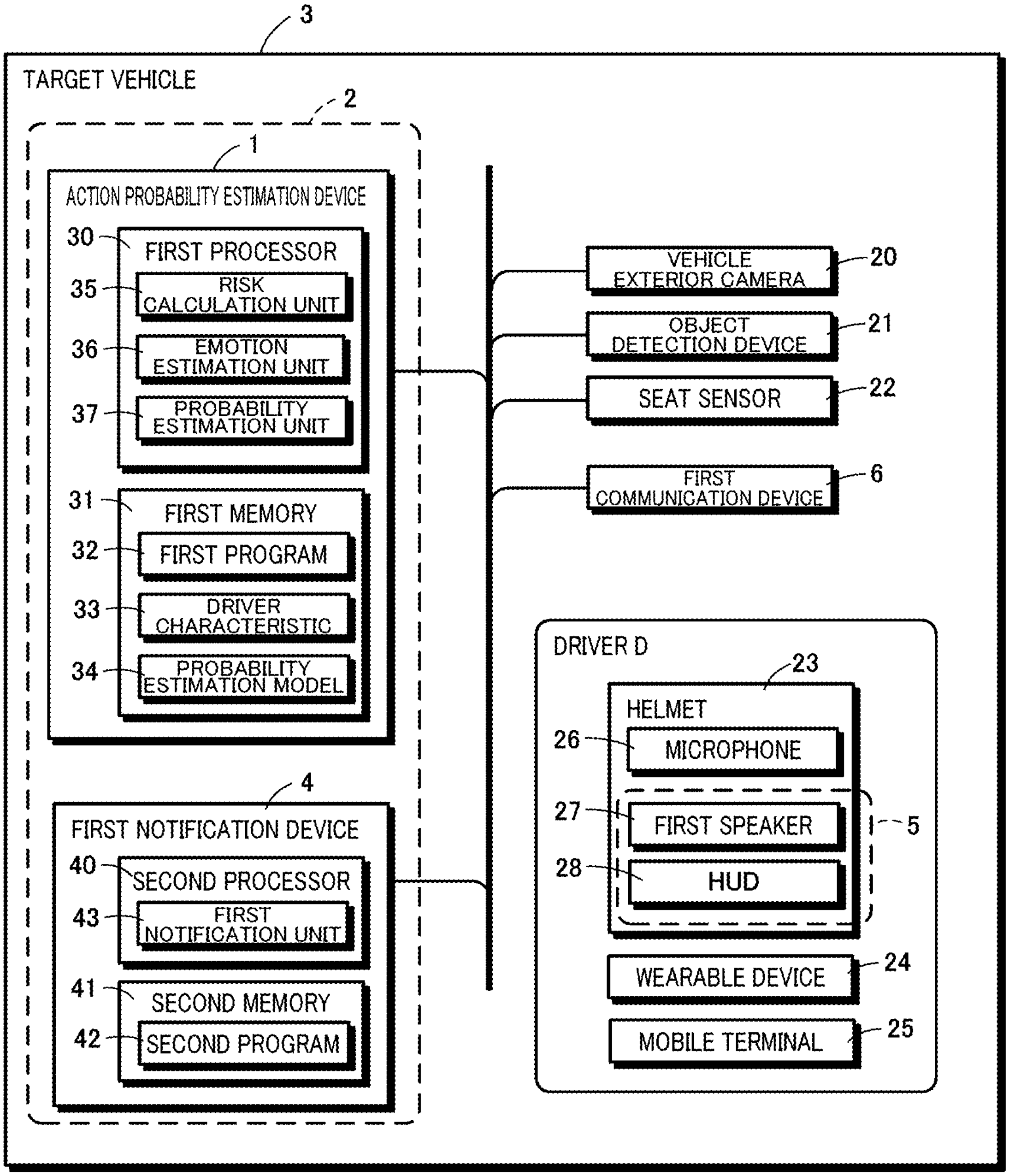
FIG. 3 is a diagram illustrating a configuration of an action probability estimation device mounted on a target vehicle as a motorcycle and a configuration of a traffic safety support system including the action probability estimation device.

FIG. 3 is a diagram illustrating a configuration of the action probability estimation device 1 mounted on the target vehicle 3 as a motorcycle and a configuration of the traffic safety support system 2 including the action probability estimation device 1.

The action probability estimation device 1 and the first notification device 4 are operated by obtaining information from various sensors and/or devices which are provided in the target vehicle 3 or are worn or possessed by the driver D who is a rider.

For example, the target vehicle 3 includes a vehicle exterior camera 20, an object detection device 21, and a seat sensor 22. The vehicle exterior camera 20 is disposed, for example, at the front part and the rear part of the vehicle body of the target vehicle 3, and outputs images or videos of the front and rear sides of the target vehicle 3. The object detection device 21 is, for example, radar, Lidar, and/or sonar disposed in the front part and the rear part of the vehicle body of the target vehicle 3, and outputs information on the positions of objects present in front of and behind the target vehicle 3. In addition, the seat sensor 22 is provided on a seat on which the driver D sits, and outputs physiological data such as a pulse and a respiratory rate of the driver D.

The driver D of the target vehicle 3 can wear, for example, a helmet 23 and a wearable device 24 such as a smart watch. The helmet 23 may be provided with a microphone 26, a first speaker 27, and a head-up display (HUD) 28. The first speaker 27 and the HUD 28 are examples of the first HMI device 5 used in the target vehicle 3. The first HMI device 5 may include any other HMI device according to the type of the target vehicle 3. Such an HMI device can be, for example, a tactile HMI such as a vibration handle that includes a vibration actuator on a handle and transmits information to the driver D who holds the handle by vibration. Alternatively, when the target vehicle 3 includes a seat with a seat belt, the HMI device may be an electric seat belt capable of calling attention by changing the tension of the seat belt. The same applies to the second HMI device 9 included in the traffic participant 7.

The wearable device 24 detects physiological data such as pulse, blood pressure, and skin potential of the driver D. The driver D of the target vehicle 3 may also possess a mobile terminal 25. For example, the mobile terminal 25 stores a schedule indicating an action schedule of the driver D according to the technology in the related art.

The mobile terminal 25, the wearable device 24, and the microphone 26, the first speaker 27, and the HUD 28 of the helmet 23 can be communicably connected to each other or another device included in the target vehicle 3 via the first communication device 6 by short-range radio such as Bluetooth (registered trademark).

The action probability estimation device 1 includes a first processor 30 and a first memory 31. The first memory 31 includes, for example, a volatile and/or nonvolatile semiconductor memory. The first memory 31 as a storage device stores a first program 32, a driver characteristic 33, and a probability estimation model 34.

The first processor 30 is, for example, a computer including a CPU and the like. The first processor 30 may have a configuration including a ROM in which a program is written, a RAM for temporary storage of data, and the like. The first processor 30 includes a risk calculation unit 35, an emotion estimation unit 36, and a probability estimation unit 37 as functional elements or functional units.

These functional elements included in the first processor 30 are implemented, for example, by the first processor 30, which is a computer, executing the first program 32 stored in the first memory 31. Note that the first program 32 can be stored in any computer-readable storage medium. Alternatively, all or some of the functional elements included in the first processor 30 may be configured by hardware including one or more electronic circuit components.

The risk calculation unit 35 calculates a risk index value that is a numerical value representing a degree of magnitude of a collision risk between the target vehicle 3 and the traffic participant around the target vehicle 3. As described above, in the present embodiment, the traffic participant 7 is the preceding vehicle 7*a* and the following vehicle 7*b*.

In the present embodiment, the risk index value is, for example, a forward collision margin time that is a time to collision between the preceding vehicle 7*a* and the target vehicle 3, and a backward collision margin time that is a time to collision between the following vehicle 7*b* and the target vehicle 3. As a result, a contact risk between the target vehicle 3 and the traffic participant 7 that is another vehicle present around the target vehicle 3 can be appropriately ascertained as an objective numerical value.

Hereinafter, the forward collision margin time and the backward collision margin time are also referred to as a forward TTC and a backward TTC, respectively (FIG. 2).

The emotion estimation unit 36 calculates an emotion level that is a numerical value representing a degree of magnitude of an unpleasant emotion currently felt by driver D. Specifically, the emotion estimation unit 36 calculates the emotion level on the basis of, for example, the physiological data of the driver D and/or the action schedule of the driver D. Here, the physiological data of the driver D can be acquired from the seat sensor 22 and/or the wearable device 24. In addition, the action schedule of the driver D can be acquired from the mobile terminal 25.

In the present embodiment, for example, the emotion estimation unit 36 calculates, as the emotion level of the driver D, either a value "1" representing an unpleasant emotion or a value "0" representing a non-unpleasant emotion ("pleasant" emotion or "neutral, neither pleasant nor unpleasant" emotion). Specifically, for example, the emotion estimation unit 36 divides a range of values of the blood pressure and the respiratory rate, which are the physiological data of the driver D, into five stages from a resting level to an excitement level, and allocates values from 1 to 5 to each stage, as a numerical value indicating an excitement state. In addition, the emotion estimation unit 36 divides a length of a remaining time until the next event indicated in the action schedule into five stages from margin to urgency, and allocates values from 1 to 5 to each stage, as a numerical value indicating a temporal urgency state. In addition, the emotion estimation unit 36 calculates a weighted addition value of a numerical value representing the excitement state and a numerical value representing the temporal urgency state. Then, the emotion estimation unit 36 sets the emotion level to "1" (unpleasant) when the calculated weighted addition value is equal to or greater than a predetermined threshold value, and sets the emotion level to "0" (pleasant or neutral) when the weighted addition value is less than the threshold value. The weight used for the weighted addition can be determined in advance.

In addition to the above, when music is output from the first speaker 27 of the helmet 23, the emotion estimation unit 36 can reduce the value of the emotion level in consideration of the output of the music as an affirmative factor that causes the emotion of the driver D to be directed in the "pleasant" direction. For example, when the music is output from the mobile terminal 25 to the first speaker 27, the information on whether or not the music is output from first speaker 27 can be acquired from the mobile terminal 25.

The probability estimation unit 37 estimates an action probability that is a probability that the driver D of the target vehicle 3 executes a predetermined steering action, which is determined in advance, in the target vehicle 3, on the basis of the risk index value calculated by the risk calculation unit 35 and the driver characteristic 33 stored in the first memory 31. As described above, in the present embodiment, the predetermined steering action is, for example, a lane change action of changing a traveling lane of the target vehicle 3 from the lane 12*a* to the lane 12*b* in order to avoid the preceding vehicle 7*a* traveling on the lane 12*a*.

The driver characteristic 33 is a characteristic of the driver D of the target vehicle 3. In the present embodiment, the driver characteristic 33 includes a confidence level that is a numerical value representing a degree of a level of confidence of the driver D regarding his/her driving skill, and a situational daring level that is a numerical value indicating a degree of magnitude of a tendency of the driver D to carry out an action while knowing that it is dangerous. As a result, the action probability that the driver D of the target vehicle 3 executes a predetermined steering action according to the collision risk with the traffic participant 7 can be appropriately estimated in consideration of characteristics such as the personality of the driver D of the target vehicle 3.

The confidence level and the situational daring level are calculated in advance for each individual to be the driver D, and are stored as a part of the driver characteristic 33 in the first memory 31. As a result, it is possible to appropriately estimate the action probability, which can be different according to the characteristics of each driver even when the traffic situation is the same, according to the characteristics of each driver.

The confidence level can be determined in advance, for example, from the scoring of answers (for example, answer to five-grade evaluation) of the individual driver D regarding a driving style check sheet (Rider Skill Questionnaire (RSQ) or Driver Skill Questionnaire (DSQ)) according to the technology in the related art. The driving style check sheet includes, for example, a plurality of questions regarding a predetermined driving skill such as "Do you worry about causing a car accident while driving?".

In addition, the situational daring level can be determined in advance, for example, from the scoring of answers of the individual driver D regarding a risk propensity questionnaire (RPQ) according to the technology in the related art. The risk propensity questionnaire includes, for example, a plurality of predetermined questions regarding traffic actions in traffic scenes that may include a dangerous situation, such as "When walking, do you cross the road when there is no car coming even if it is on a red light?".

The probability estimation unit 37 may estimate the action probability on the basis of the emotion level calculated by the emotion estimation unit 36 in addition to the risk index value and the driver characteristic 33. As a result, it is possible to appropriately estimate the action probability that can be different according to an emotional state of the individual driver at that time even when the traffic situation is the same, in consideration of the current emotional state of the driver.

As described above, the emotion level can be calculated as a value corresponding to the excitement state of the driver D and/or the temporal urgency state. As a result, by estimating the action probability in consideration of the emotion level, it is possible to more appropriately estimate the action probability in consideration of the excitement state and/or a mental state such as the sense of urgency caused by the action schedule of the driver D.

In the present embodiment, the probability estimation unit 37 calculates the action probability that is a probability that the driver D executes the lane change action of the target vehicle 3 by using the probability estimation model 34 stored in the first memory 31, on the basis of the risk index value, the emotion level, and the confidence level and the situational daring level that are the driver characteristic 33. As a result, the action probability for the lane change action of the target vehicle 3, which is likely to be affected by the characteristics such as the personality of the driver D of the target vehicle 3 and has a large influence on the surrounding traffic participant 7, can be appropriately estimated in consideration of the characteristics of the driver D.

The probability estimation model 34 is a model indicating a relationship between the risk index value, the emotion level, and the confidence level and the situational daring level of the driver D who is various individuals, and the action probability that the driver D performs a predetermined driving action (the lane change action in the present embodiment). The probability estimation model 34 is, for example, a logistic regression model, and partial regression coefficients of a logistic function representing an action probability are given as functions of a risk index value, an emotion level, and a confidence level and a situational daring level of the driver D. The above function is, for example, weighted addition of the risk index value, the emotion level, the confidence level, and the situational daring level.

As a result, the action probability that can occur as a result of a plurality of factors can be objectively estimated using a statistical method.

Specifically, the logistic regression model given by the probability estimation model 34 is given by the following Expressions (1) and (2).

[MATH. 1]

$$p(x) = \frac{1}{1 + e^{-Z}} \tag{1}$$

here, $$Z = a_1x_1 + a_2x_2 + a_3x_3 + a_4x_4 + a_5x_5 \tag{2}$$

Here, x1 and x2 are the forward TTC and the backward TTC which are risk index values, respectively. In addition, x3 and x4 are the confidence level and the situational daring level as the driver characteristic 33, respectively. In addition, x5 is the emotion level. a1, a2, a3, a4, and a5 in Expression (1) are weighting coefficients determined by logistic regression analysis on the relationship between the forward TTC, the backward TTC, the confidence level, the situational daring level, and the emotion level, and the action probability. Note that, in a case where the emotion level is not used in estimating the action probability, the last term a5x5 illustrated in Expression (2) is not used.

The probability estimation unit 37 outputs the calculated action probability to the first notification device 4 described later.

3. Configuration of Traffic Safety Support System

The traffic safety support system 2 includes the action probability estimation device 1 and the first notification device 4.

The first notification device 4 notifies the driver D of the target vehicle 3 and/or the traffic participant 7.

The traffic safety support system 2 causes the first notification device 4 to perform various notifications for traffic safety support, to the driver D of the target vehicle 3 and/or the traffic participant 7 on the basis of the action probability predicted by the action probability estimation device 1.

In the present embodiment, the traffic safety support system 2 notifies the target vehicle 3 and/or the following vehicle **7*b* for the traffic safety support, on the basis of the action probability of the lane change action of the target vehicle 3 estimated by the action probability estimation device 1**.

The first notification device 4 includes a second processor 40 and a second memory 41. The second memory 41 includes, for example, a volatile and/or nonvolatile semiconductor memory. The second memory 41 stores a second program 42.

The second processor 40 is, for example, a computer including a CPU and the like. The second processor 40 may have a configuration including a ROM in which a program is written, a RAM for temporary storage of data, and the like. The second processor 40 includes a first notification unit 43 as a functional element or a functional unit.

The first notification unit 43 is implemented by the second processor 40, which is a computer, executing the second program 42 stored in the second memory 41. Note that the second program 42 can be stored in any computer-readable storage medium. Alternatively, all or some of the functional elements included in the second processor 40 may be configured by hardware including one or more electronic circuit components.

In a case where the backward TTC is less than a predetermined first time threshold value (for example, less than 6 seconds), when the action probability of the target vehicle 3 is less than a predetermined probability threshold value, the first notification unit 43 performs an attention calling notification with a first level to the target vehicle 3 and the following vehicle **7*b* In addition, in a case where the backward TTC is less than the predetermined first time threshold value, when the action probability of the target vehicle 3 is equal to or greater than the probability threshold value, the first notification unit 43 performs an attention calling notification with a second level having a higher salience level than the attention calling notification with the first level, to the target vehicle 3 and the following vehicle 7*b***.

As a result, the attention calling notification is performed not only to the target vehicle 3 but also to the following vehicle **7*b* that is the traffic participant 7 according to the action probability of the target vehicle 3 estimated in consideration of the characteristic of the driver D, so that it is possible to appropriately and previously prevent a dangerous state that may be caused by the driver D of the target vehicle 3 according to the characteristic and the situation. In addition, since the attention calling notification based on the highly accurate action probability estimation performed by the action probability estimation device 1 in consideration of the characteristics of the driver D is given to the driver D, it is possible to enhance the acceptability of the driver D and the traffic participant 7 with the notification. As a result, the reliability of the driver D and the traffic participant 7 with respect to the traffic safety support system 2** can be enhanced, and the effects of the traffic safety support by the attention calling notification can be enhanced.

In the above description, the attention calling notification with the first level and the attention calling notification with the second level in the following vehicle **7*b* can be specifically performed by the first notification unit 43 causing the first communication device 6 to transmit a first notification instruction for instructing the following vehicle 7*b* to perform the attention calling notification with the first level and a second notification instruction for instructing the following vehicle 7*b*** to perform the attention calling notification with the second level, respectively.

As described later, when receiving the first notification instruction, the second notification device 8 of the following vehicle **7*b* as the traffic participant 7 performs the attention calling notification with the first level in the following vehicle 7*b* by using a display device 50 (display) and/or a second speaker 51 as the second HMI device 9 mounted on the following vehicle 7*b*. In addition, when receiving the second notification instruction, the second notification device 8 of the following vehicle 7***b* performs the attention calling notification with the second level in the following vehicle 7*b* by using the display device 50 and/or the second speaker 51 as the second HMI device 9 mounted on the following vehicle 7*b*.

Here, the salience level of the attention calling notification refers to a degree of strength with which the stimulus to the human's hearing or vision output as the attention calling notification by the first HMI device 5 and the second HMI device 9 attracts or induces the human's attention.

For example, the salience level of the auditory stimulus that is the sound output from the first speaker 27 or the second speaker 51 corresponds to the intensity of the sound, the height of the frequency, the short repetition period, and/or the short change period of the intensity or the frequency of the sound. The higher the intensity of the sound, the higher the frequency, the shorter the repetition period, and/or the shorter the change period of the intensity or the frequency, the higher the salience level of the auditory stimulus given by the sound.

In addition, for example, in a case where visual information is output as a graphic element such as a character or a figure displayed on the display device, the salience level of the visual information displayed on the HUD 28 or the display device 50 as the display device can be determined by the luminance, the luminance change period, the blinking period, or the hue of the displayed graphic element. For example, the higher the luminance, the shorter the luminance change period or blinking period, or the closer the hue is from cool to warm, the higher the salience level of the visual information.

Alternatively, in a case where notification is made by a tactile stimulus that is a vibration from a steering wheel or the like, the salience level of the tactile stimulus corresponds to the intensity of the vibration, the height of the frequency, the short repetition period, and/or the short change period of the intensity or the frequency. The higher the intensity of the vibration, the higher the frequency, the shorter the repetition period, and/or the shorter the change period of the intensity or the frequency, the higher the salience level of the tactile stimulus given by the vibration.

Alternatively, in a case where the tactile stimulus is output as the tension of the electric seat belt, the salience level of the tactile stimulus corresponds to the magnitude of the tension. The greater the tension, the higher the salience level of the tactile stimulus given by the tension.

Note that, in each of the attention calling notification with the first level and the attention calling notification with the second level, details of a mode of the auditory stimulus and/or the visual information output from each of the first HMI device 5 and the second HMI device 9 can be determined in advance in the first notification device 4 and the second notification device 8. The same applies to a case where the first HMI device 5 and the second HMI device 9 perform a notification by the tactile stimulus.

In addition, in a case where the backward TTC is equal to or greater than the first time threshold value (for example, 6 seconds or greater) and is equal to or less than a predetermined second time threshold value (for example, 10 seconds or less) that is greater than the first time threshold value, when the action probability of the target vehicle 3 is less than the probability threshold value, the first notification unit 43 performs a notification of information presentation indicating the presence of the target vehicle 3 in the following vehicle 7*b*. In addition, in a case where the backward TTC is equal to or greater than the first time threshold value and is equal to or less than the second time threshold value, when the action probability of the target vehicle 3 is equal to or greater than the probability threshold value, the first notification unit 43 performs the attention calling notification with the first level in the following vehicle 7*b*. The notification of the information presentation may be, for example, an information message such as "the motorcycle is traveling in the adjacent lane ahead".

As a result, in a case where the following vehicle 7*b* has enough time to take an avoidance action, the notification of the information presentation or the attention calling is performed only to the following vehicle 7*b*, and the risk of occurrence of the contact accident can be effectively reduced without bothering the driver D of the target vehicle 3.

Note that the notification of information presentation and the attention calling notification with the first level in the following vehicle 7*b* can be specifically performed by the first notification unit 43 causing the first communication device 6 to transmit the information notification instruction, which is for instructing the following vehicle 7*b* to perform a notification of information presentation, and the above-described first notification instruction, respectively. The information notification instruction may include, for example, the above-described information message.

For example, when transmitting the first notification instruction, the second notification instruction, and the information notification instruction to the second notification device 8 of the specific traffic participant 7 such as the following vehicle 7*b*, the first notification unit 43 establishes communication with the second communication device 10 by using access information (for example, an identification ID such as a communication address of the second communication device 10) of the second communication device 10 of the traffic participant 7. When the traffic participant 7 is a vehicle, the access information of the second communication device 10 of the traffic participant 7 can be associated in advance with a number of a vehicle number (license plate) of the vehicle, for example. The information on the correspondence relationship between the vehicle number and the access information can be acquired from, for example, a server (not illustrated) that provides the information.

In the present embodiment, the first notification unit 43 transmits the first notification instruction, the second notification instruction, and the information notification instruction to the following vehicle 7*b* as the traffic participant 7, but the destination of these instructions may include other traffic participants 7 including the preceding vehicle 7*a*.

4. Device Configuration in Traffic Participant

Figure 4:
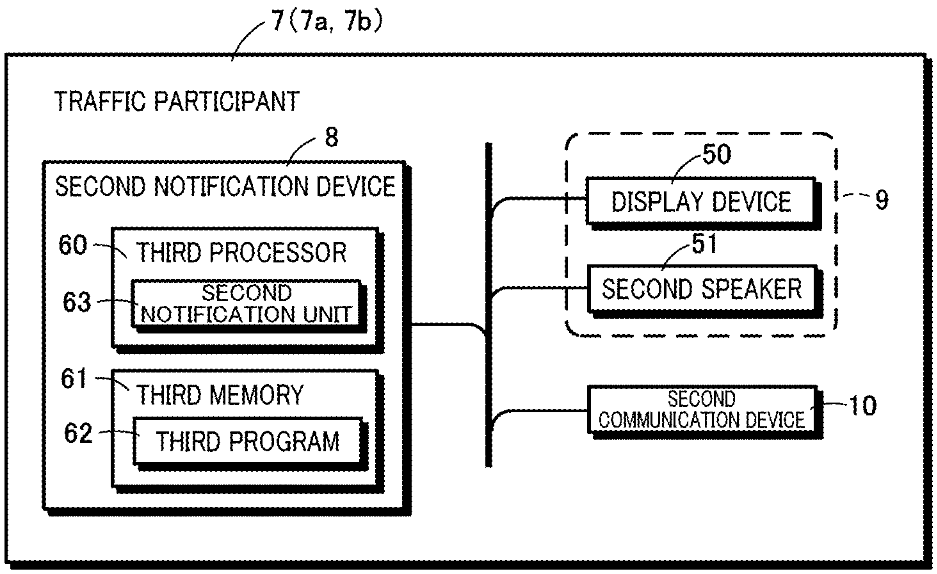
FIG. 4 is a diagram illustrating an example of a device configuration in a traffic participant.

FIG. 4 is a diagram illustrating an example of a device configuration in the traffic participant 7. The traffic participant 7 includes the second notification device 8, the display device 50, the second speaker 51, and the second communication device 10. The display device 50 and the second speaker 51 are examples of the second HMI device 9. In the present embodiment, the traffic participant 7 is the preceding vehicle 7*a* and the following vehicle 7*b*, and the second notification device 8, the display device 50, the second speaker 51, and the second communication device 10 are configured as in-vehicle devices, for example. For example, the display device 50 and the second speaker 51 can be provided on an instrument panel in the vehicle interior, for example.

The second notification device 8 includes a third processor 60 and a third memory 61. The third memory 61 includes, for example, a volatile and/or nonvolatile semiconductor memory. The third memory 61 stores a third program 62.

The third processor 60 is, for example, a computer including a CPU and the like. The third processor 60 may have a configuration including a ROM in which a program is written, a RAM for temporary storage of data, and the like. The third processor 60 includes a second notification unit 63 as a functional element or a functional unit.

The second notification unit 63 is implemented by the third processor 60, which is a computer, executing the third program 62 stored in the third memory 61. Note that the third program 62 can be stored in any computer-readable storage medium. Alternatively, all or some of the functional elements included in the third processor 60 may be configured by hardware including one or more electronic circuit components.

When receiving the first notification instruction from the first notification device 4 of the target vehicle 3, the second notification unit 63 performs the attention calling notification with the first level in the traffic participant 7 by using the display device 50 and/or the second speaker 51 as the second HMI device 9. In addition, when receiving the second notification instruction from the first notification device 4 of the target vehicle 3, the second notification unit 63 performs the attention calling notification with the second level having a higher salience level than the attention calling notification with the first level, in the traffic participant 7 by using the display device 50 and/or the second speaker 51. In addition, when receiving the information notification instruction from the first notification device 4 of the target vehicle 3, the second notification unit 63 performs the notification of the information presentation indicating the presence of the target vehicle 3, in the traffic participant 7 by using the display device 50 and/or the second speaker 51.

The modes of the attention calling notification with the first level and the attention calling notification with the second level output from the second HMI device 9 in the traffic participant 7 can be determined in advance in the second notification device 8.

4. Operation of Traffic Safety Support System

Next, the procedure of the operation of the traffic safety support system 2 will be described.

Figure 5:
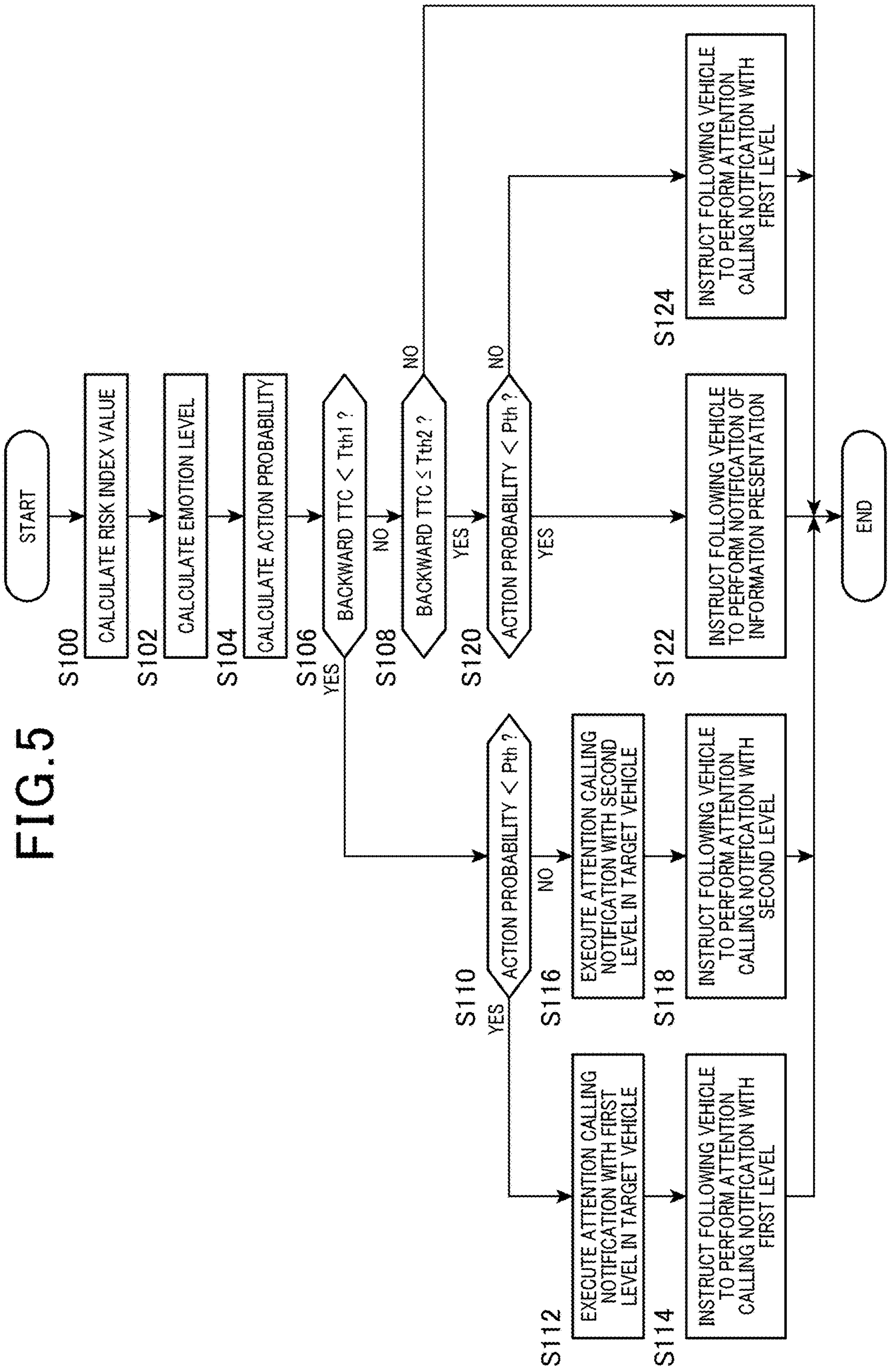
FIG. 5 is a flowchart illustrating a procedure of an operation of the traffic safety support system.

FIG. 5 is a flowchart illustrating a procedure of the operation of the traffic safety support system 2 including the action probability estimation device 1. The processing illustrated in FIG. 5 is executed by the first processor 30 and the second processor 40 which are computers included in the traffic safety support system 2. The processing illustrated in FIG. 5 is started at least when the action probability estimation device 1 and the first notification device 4 of the target vehicle 3 are powered on, and is repeatedly executed.

When the processing is started, first, the risk calculation unit 35 of the action probability estimation device 1 calculates a risk index value representing a degree of magnitude of the collision risk between the traffic participant 7 around the target vehicle 3 and the target vehicle 3 (S100). In the present embodiment, the risk index value is a forward TTC between the target vehicle 3 and the preceding vehicle 7*a* traveling in front of the target vehicle 3, and a backward TTC between the target vehicle 3 and the following vehicle 7*b* traveling behind the target vehicle 3.

Next, the emotion estimation unit 36 calculates an emotion level that is a numerical value representing a degree of magnitude of an unpleasant emotion currently felt by driver D (S102). Subsequently, the probability estimation unit 37 calculates an action probability that is a probability that the driver D of the target vehicle 3 executes a predetermined steering action, which is determined in advance, in the target vehicle 3 (S104). For example, the probability estimation unit 37 refers to the driver characteristic 33 stored in the first memory 31, and acquires the confidence level and the situational daring level of the driver D. Then, the probability estimation unit 37 calculates the action probability that the lane change action of the target vehicle 3 is executed, by using the probability estimation model 34 (for example, Expressions (1) and (2) described above) stored in the first memory 31 on the basis of the forward TTC and the backward TTC calculated in step S100, the emotion level calculated in step S102, and the confidence level and the situational daring level acquired from the driver characteristic 33.

The action probability estimation device 1 transmits the risk index value calculated by the risk calculation unit 35 and the action probability calculated by the probability estimation unit 37 to the first notification device 4.

Next, the first notification unit 43 of the first notification device 4 determines whether or not the backward TTC is less than a first time threshold value Tth1 (S106). Then, when the backward TTC is less than the first time threshold value Tth1 (S106, YES), the first notification unit 43 determines whether or not the action probability is less than a probability threshold value Pth (S110).

Then, when the action probability is less than the probability threshold value Pth in step S110 (S110, YES), the first notification unit 43 performs the attention calling notification with the first level to the driver D by using the first HMI device 5 of the target vehicle 3 (S112). In the present embodiment, the first HMI device 5 is specifically the first speaker 27 and the HUD 28 of the helmet 23 worn by the driver D of the target vehicle 3 that is a motorcycle.

In addition, the first notification unit 43 also transmits the first notification instruction, which instructs the following vehicle 7*b* to perform the attention calling notification with the first level, to the following vehicle 7*b* (S114), and the present processing is ended.

On the other hand, when the action probability is equal to or greater than the probability threshold value Pth (S110, NO), the first notification unit 43 performs the attention calling notification with the second level having a higher salience level than the attention calling notification with the first level, to the driver D of the target vehicle 3 by using the first HMI device 5 of the target vehicle 3 (S116). In addition, the first notification unit 43 also transmits the second notification instruction, which instructs the following vehicle 7*b* to perform the attention calling notification with the second level, to the following vehicle 7*b* (S118), and the present processing is ended.

On the other hand, when the backward TTC is equal to or greater than the first time threshold value Tth1 in step S106 (S106, NO), the first notification unit 43 determines whether or not the backward TTC is equal to or less than a second time threshold value Tth2 greater than the first time threshold value Tth1 (S108). Then, when the backward TTC is equal to or less than the second time threshold value Tth2 (S108, YES), the first notification unit 43 determines whether or not the action probability is less than the probability threshold value Pth (S120).

When the action probability is less than the probability threshold value Pth (S120, YES), the first notification unit 43 transmits the information notification instruction, which instructs the following vehicle 7*b* to perform the notification of the information presentation, to the following vehicle **7*b* (S122**), and the present processing is ended.

On the other hand, when the action probability is equal to or greater than the probability threshold value Pth (S120, NO), the first notification unit 43 transmits the first notification instruction for instructing the following vehicle **7*b* to perform the attention calling notification with the first level (S124**), and the present processing is ended.

In addition, on the other hand, when the backward TTC exceeds the second time threshold value Tth2 in step S108 (S108, NO), the first notification unit 43 ends the present processing.

Note that, in FIG. 5, steps S100 to S104 correspond to an action probability estimation method executed by the first processor 30 that is a computer of the action probability estimation device 1. In addition, steps S100 and S104 correspond to a risk calculation step and an estimation step in the present disclosure, respectively.

5. Other Embodiments

In the embodiment described above, the driver characteristic 33 and/or the probability estimation model 34 are stored in advance in the first memory 31 of the action probability estimation device 1. However, the first processor 30 (for example, the probability estimation unit 37) may download the driver characteristic 33 and/or the probability estimation model 34 from a server (not illustrated) via a communication network (not illustrated).

The action probability estimation device 1 and the traffic safety support system 2 may include a server device communicably connected to the target vehicle 3 and the traffic participant 7 via a communication network. In this case, the risk calculation unit 35 may calculate the risk index value from an image or a video acquired using a traffic infrastructure such as a street lamp camera. In addition, the emotion estimation unit 36 can receive a sensor output of the seat sensor 22 or the like from the target vehicle 3, and calculate the emotion level.

The probability estimation model 34 is not limited to a model expressed by an analytical expression such as a logistic regression model, and may be a model generated by machine learning using a neural network.

Note that the present invention is not limited to the configuration of the above embodiment, and can be practiced in various embodiments without departing from the gist thereof.

6. Configurations Supported by Above Embodiment

The above embodiment supports the following configurations.

(Configuration 1) An action probability estimation device comprising:

- a risk calculation unit that calculates a risk index value as a numerical value representing a degree of magnitude of a collision risk between a traffic participant around a target vehicle and the target vehicle; and
- a probability estimation unit that estimates, on the basis of the risk index value and a driver characteristic as a characteristic of a driver of the target vehicle, an action probability as a probability that the driver executes a predetermined steering action, which is determined in advance, in the target vehicle,
- wherein the driver characteristic includes a confidence level as a numerical value representing a degree of a level of confidence of the driver regarding his/her driving skill, and a situational daring level as a numerical value indicating a degree of magnitude of a tendency of the driver to carry out an action while knowing that it is dangerous.

With the action probability estimation device in Configuration 1, the action probability that the driver of the target vehicle executes a predetermined steering action according to the collision risk with the traffic participant can be appropriately estimated in consideration of characteristics such as the personality of the driver of the target vehicle.

(Configuration 2) The action probability estimation device according to Configuration 1,

- wherein the confidence level and the situational daring level are calculated in advance for each individual to be the driver, and are stored as a part of the driver characteristic in a storage device.

With the action probability estimation device in Configuration 2, it is possible to appropriately estimate the action probability, which can be different according to the characteristics of each driver even when the traffic situation is the same, according to the characteristics of each driver.

(Configuration 3) The action probability estimation device according to Configuration 1 or 2, further including:

- an emotion estimation unit that calculates an emotion level as a numerical value representing a degree of magnitude of an unpleasant emotion felt by the driver,
- wherein the probability estimation unit estimates the action probability on the basis of the driver characteristic, the risk index value, and the emotion level.

With the action probability estimation device in Configuration 3, it is possible to appropriately estimate the action probability that can be different according to an emotional state of the individual driver at that time even when the traffic situation is the same, in consideration of the current emotional state of the driver.

(Configuration 4) The action probability estimation device according to Configuration 3,

- wherein the emotion estimation unit calculates an emotion level on the basis of physiological data of the driver and/or an action schedule of the driver.

With the action probability estimation device in Configuration 4, it is possible to appropriately estimate the action probability in consideration of an excitement state and/or a mental state such as the sense of urgency caused by the action schedule of the driver.

(Configuration 5) The action probability estimation device according to any one of Configurations 1 to 4,

- wherein the action probability is estimated using a logistic regression model (logistic function).

With the action probability estimation device in Configuration 5, the action probability that can occur as a result of a plurality of factors can be objectively estimated using a statistical method.

(Configuration 6) The action probability estimation device according to any one of Configurations 1 to 5,

- wherein the predetermined steering action is a lane change action of changing a traveling lane of the target vehicle.

With the action probability estimation device in Configuration 6, the action probability for the lane change action of the target vehicle, which is likely to be affected by the characteristics such as the personality of the driver of the target vehicle and has a large influence on the surrounding traffic participant, can be appropriately estimated in consideration of the characteristics of the driver.

(Configuration 7) The action probability estimation device according to any one of Configurations 1 to 6, wherein the risk index value is represented by a forward collision margin time that is a time to collision between a preceding vehicle, which is the traffic participant and travels in front of the target vehicle, and the target vehicle, and a backward collision margin time that is a time to collision between a following vehicle, which is the traffic participant and travels behind the target vehicle, and the target vehicle.

With the action probability estimation device in Configuration 7, in a case where the traffic participant present around the target vehicle is another vehicle, a contact risk between the target vehicle and the traffic participant can be appropriately ascertained as an objective numerical value.

(Configuration 8) The action probability estimation device according to Configuration 7, wherein the target vehicle is a motorcycle, and the following vehicle is a four-wheeled vehicle.

With the action probability estimation device in Configuration 8, it is possible to appropriately estimate the action probability for the driver and to more appropriately support the driver for safe driving by setting, as the target vehicle, the motorcycle in which control intervention in a vehicle body motion is more difficult than the four-wheeled vehicle and thus calling attention to the driver may be more important.

In addition, with the action probability estimation device in Configuration 8, in a traffic scene including a motorcycle and a four-wheeled vehicle where cooperative safety support is difficult to perform due to a difference in mobility of the vehicle body, it is possible to realize the cooperative traffic support on the basis of an action probability appropriately estimated for the motorcycle.

(Configuration 9) An action probability estimation method which is executed by a computer and estimates a probability that a driver of a target vehicle executes a predetermined steering action, the action probability estimation method including:

a risk calculation step of calculating a risk index value as a numerical value representing a degree of magnitude of a collision risk between a traffic participant around the target vehicle and the target vehicle; and an estimation step of estimating, on the basis of the risk index value and a driver characteristic as a characteristic of the driver of the target vehicle, an action probability as a probability that the driver executes a predetermined steering action, which is determined in advance, in the target vehicle, wherein the driver characteristic includes a confidence level as a numerical value representing a degree of a level of confidence of the driver regarding his/her driving skill, and a situational daring level as a numerical value indicating a degree of magnitude of a tendency of the driver to carry out an action while knowing that it is dangerous.

With the action probability estimation method in Configuration 9, the action probability that the driver of the target vehicle executes a predetermined steering action according to the collision risk with the traffic participant can be appropriately estimated in consideration of characteristics such as the personality of the driver of the target vehicle.

(Configuration 10) A traffic safety support system including:

the action probability estimation device according to Configuration 7 or 8; and a notification device that performs an attention calling notification to the driver of the target vehicle and/or the traffic participant on the basis of the action probability estimated by the action probability estimation device, wherein in a case where the backward collision margin time is less than a predetermined first time threshold value, the notification device performs an attention calling notification with a first level in the target vehicle and the following vehicle when the action probability of the target vehicle is less than a predetermined probability threshold value, and performs an attention calling notification with a second level having a higher salience level than the attention calling notification with the first level when the action probability of the target vehicle is equal or greater than the probability threshold value.

With the traffic safety support system in Configuration 10, the attention calling notification is performed not only to the target vehicle but also to the following vehicle that is the traffic participant according to the action probability of the target vehicle estimated in consideration of the characteristic of the driver, so that it is possible to appropriately and previously prevent a dangerous state that may be caused by the driver of the target vehicle according to the characteristic and the situation.

(Configuration 11) The traffic safety support system according to Configuration 10, wherein in a case where the backward collision margin time is equal to or greater than the first time threshold value and is equal to or less than a predetermined second time threshold value that is greater than the first time threshold value, the notification device performs a notification of information presentation indicating presence of the target vehicle, in the following vehicle when the action probability of the target vehicle is less than the probability threshold value, and performs the attention calling notification with the first level in the following vehicle when the action probability of the target vehicle is equal to or greater than the probability threshold value.

With the traffic safety support system in Configuration 11, in a case where the following vehicle has enough time to take an avoidance action, the notification of the information presentation or the attention calling is performed only to the following vehicle, and the risk of occurrence of the contact accident can be effectively reduced without bothering the driver of the target vehicle.

REFERENCE SIGNS LIST

1 action probability estimation device
2 traffic safety support system
3 target vehicle
4 first notification device
5 first HMI device
6 first communication device
7 traffic participant
**7*a*** preceding vehicle
**7*b*** following vehicle
8 second notification device
9 second HMI device
10 second communication device
11 road
**12*a*, 12*b*** lane
20 vehicle exterior camera
21 object detection device
22 seat sensor
23 helmet
24 wearable device

25 mobile terminal
26 microphone
27 first speaker
28 HUD
30 first processor
31 first memory
32 first program
33 driver characteristic
34 probability estimation model
35 risk calculation unit
36 emotion estimation unit
37 probability estimation unit
40 second processor
41 second memory
42 second program
43 first notification unit
50 display device
51 second speaker
60 third processor
61 third memory
62 third program
63 second notification unit
D driver
H human

What is claimed is:

1. A traffic safety support system comprising an action probability estimation device that includes a processor, the processor being configured to:

calculate a risk index value as a numerical value representing a degree of magnitude of a collision risk between a traffic participant around a target vehicle and the target vehicle; and estimate, on the basis of the risk index value and a driver characteristic as a characteristic of a driver of the target vehicle, an action probability as a probability that the driver executes a predetermined steering action, which is determined in advance, in the target vehicle, wherein the driver characteristic includes a confidence level as a numerical value representing a degree of a level of confidence of the driver regarding his/her driving skill, and a situational daring level as a numerical value indicating a degree of magnitude of a tendency of the driver to carry out an action while knowing that it is dangerous, wherein the traffic safety support system further comprises a notification device that performs an attention calling notification to the driver of the target vehicle and/or the traffic participant on the basis of the action probability estimated by the action probability estimation device, and wherein the risk index value is represented by a forward collision margin time that is a time to collision between a preceding vehicle, which is the traffic participant and travels in front of the target vehicle, and the target vehicle, and a backward collision margin time that is a time to collision between a following vehicle, which is the traffic participant and travels behind the target vehicle, and the target vehicle.

2. The traffic safety support system according to claim 1, wherein the confidence level and the situational daring level are calculated in advance for each individual to be the driver, and are stored as a part of the driver characteristic in a storage device.

3. The traffic safety support system according to claim 1, wherein the processor is configured to calculate an emotion level as a numerical value representing a degree of magnitude of an unpleasant emotion felt by the driver, wherein the processor estimates the action probability on the basis of the driver characteristic, the risk index value, and the emotion level.

4. The traffic safety support system according to claim 3, wherein the processor calculates an emotion level on the basis of physiological data of the driver and/or an action schedule of the driver.

5. The traffic safety support system according to claim 1, wherein the action probability is estimated using a logistic regression model (logistic function).

6. The traffic safety support system according to claim 1, wherein the predetermined steering action is a lane change action of changing a traveling lane of the target vehicle.

7. The traffic safety support system according to claim 1, wherein the target vehicle is a motorcycle, and the following vehicle is a four-wheeled vehicle.

8. The traffic safety support system according to claim 1, wherein in a case where the backward collision margin time is less than a predetermined first time threshold value, the notification device performs an attention calling notification with a first level in the target vehicle and the following vehicle when the action probability of the target vehicle is less than a predetermined probability threshold value, and performs an attention calling notification with a second level having a higher salience level than the attention calling notification with the first level when the action probability of the target vehicle is equal to or greater than the probability threshold value.

9. The traffic safety support system according to claim 8, wherein in a case where the backward collision margin time is equal to or greater than the first time threshold value and is equal to or less than a predetermined second time threshold value that is greater than the first time threshold value, the notification device performs a notification of information presentation indicating presence of the target vehicle, in the following vehicle when the action probability of the target vehicle is less than the probability threshold value, and performs the attention calling notification with the first level in the following vehicle when the action probability of the target vehicle is equal to or greater than the probability threshold value.

10. An action probability estimation method which is executed by a computer and estimates a probability that a driver of a target vehicle executes a predetermined steering action, the action probability estimation method comprising:

a risk calculation step of calculating a risk index value as a numerical value representing a degree of magnitude of a collision risk between a traffic participant around the target vehicle and the target vehicle; and an estimation step of estimating, on the basis of the risk index value and a driver characteristic as a characteristic of the driver of the target vehicle, an action probability as a probability that the driver executes a predetermined steering action, which is determined in advance, in the target vehicle, wherein the driver characteristic includes a confidence level as a numerical value representing a degree of a level of confidence of the driver regarding his/her driving skill, and a situational daring level as a numerical value indicating a degree of magnitude of a tendency of the driver to carry out an action while knowing that it is dangerous, the action probability estimation method further comprises performing, by a notification device, an attention calling notification to the driver of the target vehicle and/or the traffic participant on the basis of the action probability estimated, wherein the risk index value is represented by a forward collision margin time that is a time to collision between a preceding vehicle, which is the traffic participant and travels in front of the target vehicle, and the target vehicle, and a backward collision margin time that is a time to collision between a following vehicle, which is the traffic participant and travels behind the target vehicle, and the target vehicle.

* * * * *